(12) United States Patent
Liu et al.

(10) Patent No.: US 6,288,333 B1
(45) Date of Patent: Sep. 11, 2001

(54) COMPUTER ENCLOSURE

(75) Inventors: Yu-Tai Liu, Hsin-Chuang; Alvin Liu, Pa-Li; Yun-Lung Chen, Chung-Ho, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/345,101

(22) Filed: Jun. 28, 1999

(30) Foreign Application Priority Data

Nov. 24, 1998 (TW) .................................. 87219536

(51) Int. Cl.$^7$ .................................. H02G 3/08; H05K 5/00
(52) U.S. Cl. .................. 174/52.1; 361/683; 361/724; 312/223.2
(58) Field of Search .................................. 361/683, 816, 361/818, 724; 174/35 R, 52.1; 312/223.2

(56) References Cited

U.S. PATENT DOCUMENTS

| 5,392,192 | * | 2/1995 | Dunn et al. ............................ 361/683 |
| 5,547,272 | * | 8/1996 | Paterson et al. ................... 312/223.2 |

* cited by examiner

Primary Examiner—Dean A. Reichard
Assistant Examiner—Hung V Ngo
(74) Attorney, Agent, or Firm—Wei Te Chung

(57) ABSTRACT

A computer enclosure includes a frame having a bottom plate and front and rear plates mounted to and extending from opposite edges of the bottom plate. A front bezel is mounted to the front plate. The front bezel has a plurality of resilient arms each forming a barb. The front plate defines a plurality of first openings for receiving the arms therein. A tab is connected to an edge of each first opening by an arcuate section for guiding the barb of the corresponding arm into the first opening whereby the barb engages with a free edge of the tab with the arm supported thereby. A plurality of bores is defined in the front plate with a tubular projection extending from the front plate surrounding each bore. A positioning pin extending from the bezel is snappingly received in the corresponding bore with the pin contacting and supported by an inside surface of the tubular projection thereby protecting the pin from being damaged by a sharp edge of the bore. A second opening is defined in the front plate for extension of wires of switches and indicators mounted on the bezel therethrough. A circumferential wall is formed on the front plate to surround the second opening for supporting the wires thereby preventing the wires from being damaged by a sharp edge of the second opening.

10 Claims, 4 Drawing Sheets

COMPUTER ENCLOSURE

BACKGROUND OF THE INVENTION

1. Field of the Invention

The present invention generally relates to a computer enclosure, and in particular to a front bezel of a computer enclosure.

2. The Prior Art

A personal computer is usually housed in an enclosure. The computer enclosure has a front bezel mounted to the computer for shielding and aesthetic purposes. The bezel has to be dismounted from the computer for replacing or adding new components, such as a CD-ROM or a floppy disk drive. Thus, the bezel must have a structure capable of enduring repeated mounting/dismounting without being damaged or broken.

An example of a computer front bezel is disclosed in Taiwan Patent Application No. 81209656 and comprises a plastic body having resilient barbs integrally formed therewith for engaging with a computer enclosure thereby mounting the bezel to the computer enclosure. The plastic barbs may be scraped and damaged by sharp edges of the computer enclosure and thus become easily broken when mounting/dismounting the bezel.

U.S. Pat. No. 5,123,680 discloses metal retaining members for retaining a plastic bezel to a computer enclosure. The metal retaining members can endure repeated mounting/dismounting without breaking. However, the metal retaining members are subject to metal fatigue caused by frequent mounting/dismounting. Furthermore, the metal retaining members must be manufactured separately which increases costs.

A power switch, a reset switch and indicators are usually mounted on a front bezel of a computer. Wires of these switches and indicators extend through an opening stamped on a computer enclosure to be connected to a main board thereof. The stamped opening usually has a sharp edge which may cut the wires thereby causing malfunction or short-circuiting.

It is thus desired to provide a computer enclosure which overcomes the problems discussed above.

SUMMARY OF THE INVENTION

Accordingly, an object of the present invention is to provide a computer enclosure having a guiding feature for guiding engagement with a front bezel thereby protecting the bezel from being damaged during mounting/dismounting.

Another object of the present invention is to provide a computer enclosure having an extended bore for receiving and protecting a corresponding positioning pin formed on a front bezel.

A further object of the present invention is to provide a computer enclosure which protects wires extending therethrough from being damaged.

To achieve the above objects, in accordance with the present invention, a computer enclosure comprises a frame having a bottom plate and front and rear plates mounted to and extending from opposite edges of the bottom plate. A front bezel is mounted to the front plate. The front bezel has a plurality of resilient arms each forming a barb. The front plate defines a plurality of first openings for receiving the arms therein. A tab is connected to an edge of each first opening by an arcuate section for guiding the barb of the corresponding arm into the first opening whereby the barb engages with a free edge of the tab with the arm supported thereby. A plurality of bores is defined in the front plate with a tubular projection extending from the front plate surrounding each bore. A positioning pin extending from the bezel is snappingly received in the corresponding bore with the pin contacting and supported by an inside surface of the tubular projection thereby protecting the pin from being damaged by a sharp edge of the bore. A second opening is defined in the front plate for extension of wires of switches and indicators mounted on the bezel therethrough. A circumferential wall is formed on the front plate to surround the second opening for supporting the wires thereby preventing the wires from being damaged by a sharp edge of the second opening.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
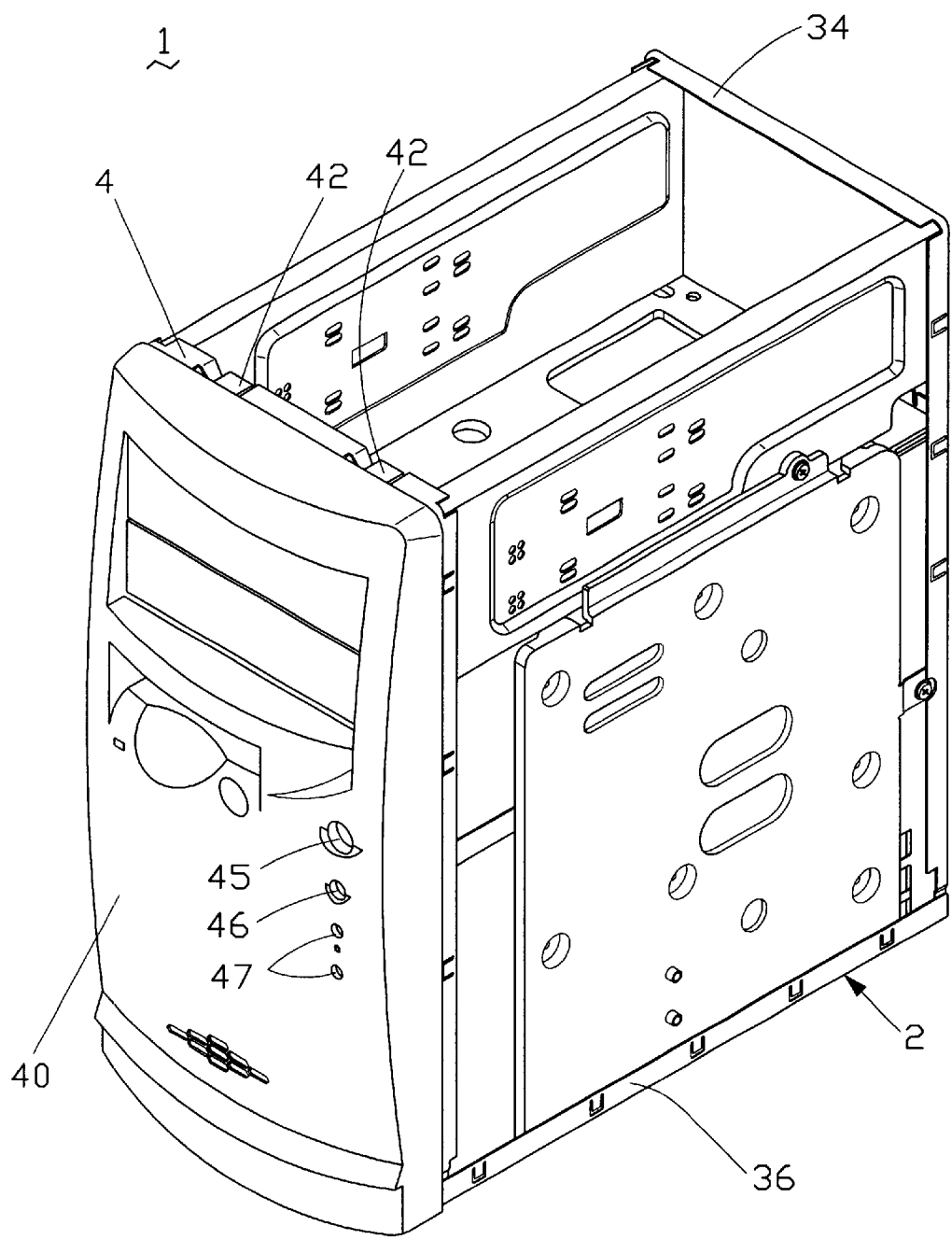
FIG. 1 is a perspective view of a computer enclosure constructed in accordance with the present invention.

Referring to the drawings and in particular to FIG. 1, a computer enclosure 1 constructed in accordance with the present invention comprises a U-shaped frame 2 having a bottom plate 36 and front and rear plates 4, 34 mounted to and extending from opposite edges of the bottom plate 34 and a front bezel 40 releasably mounted to the front plate 4. The bezel 40 is made of plastic material and comprises a plurality of retaining members 42 for engaging the front plate 4 of the frame 2 to shield and protect components (not shown) arranged inside the computer enclosure 1.

Figures 2, 2A:
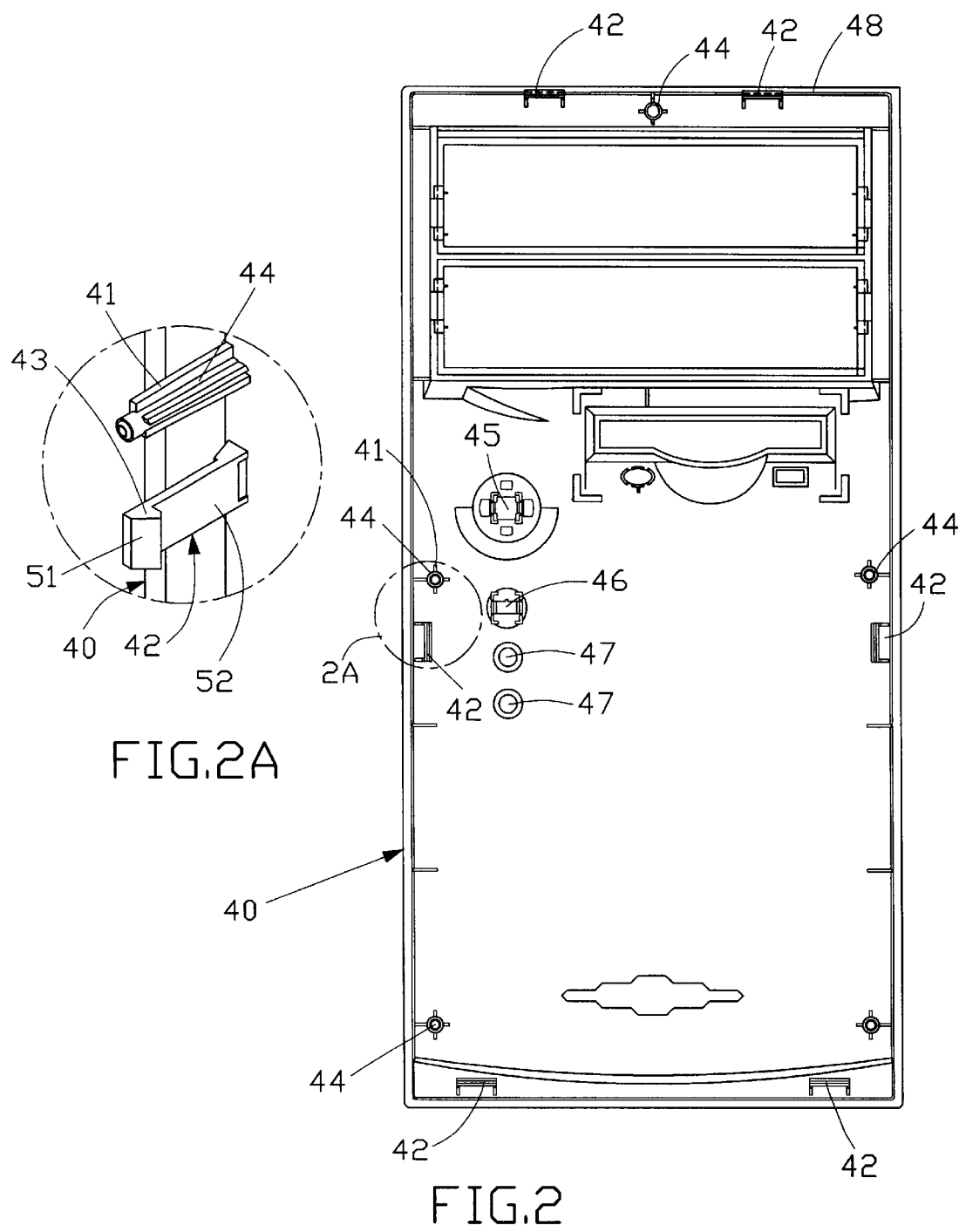
FIG. 2 is a rear view of a bezel of the computer enclosure of the present invention.
FIG. 2A is an enlarged view of encircled portion 2A of FIG. 2 in perspective form.
Figures 3, 3A:
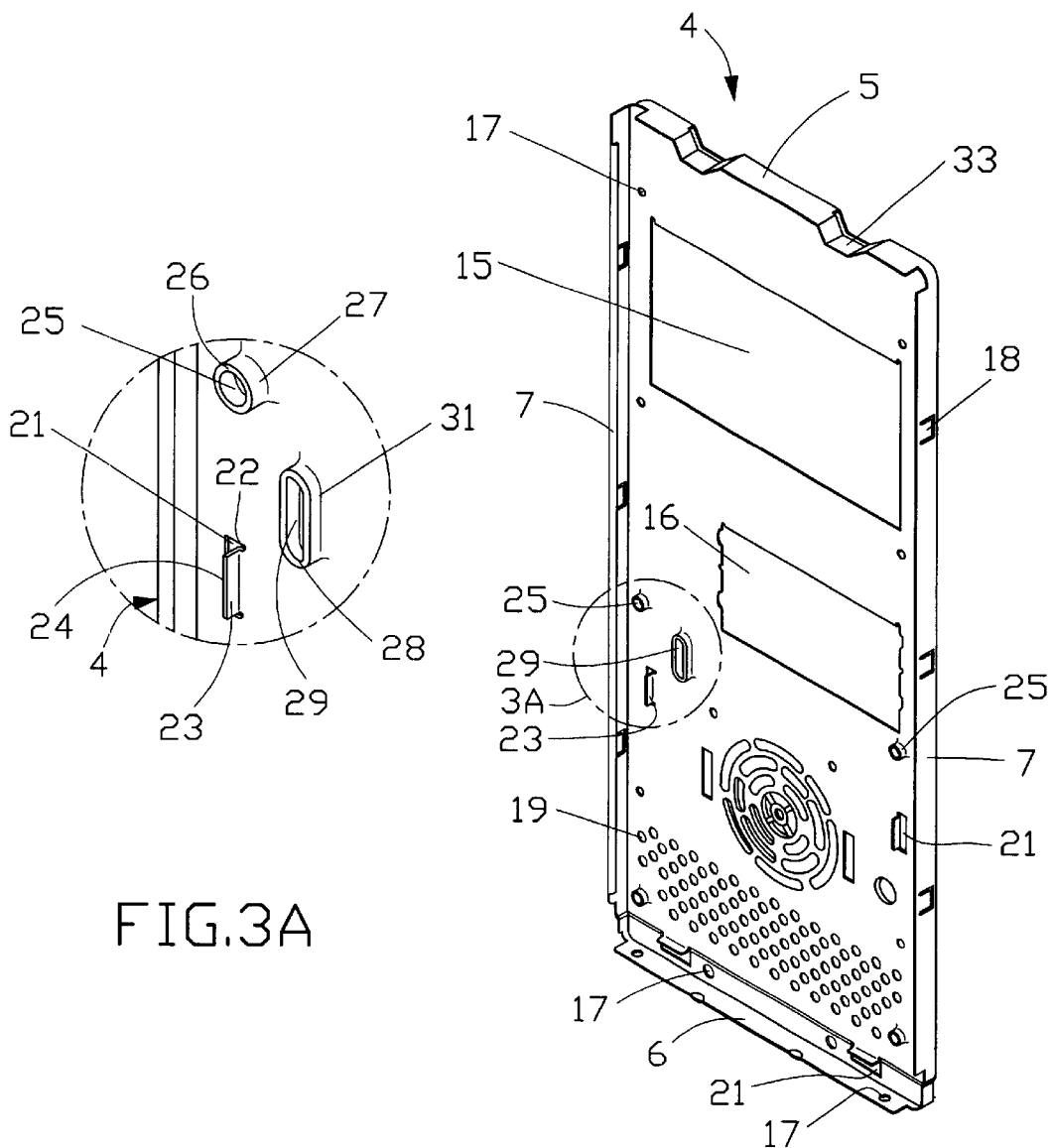
FIG. 3 is a perspective view of a front plate of a frame of the computer enclosure.
FIG. 3A is an enlarged view of encircled portion 3A of FIG. 3.

Referring to FIGS. 2 and 3, the front plate 4 of the frame 2 is made from a metal plate having upper, lower and side flanges 5, 6, 7. Resilient tabs 18 are formed on the side flanges 7 for engaging with a shielding casing (not shown) of the enclosure 1 to suppress electromagnetic interference. Two notches 33 are formed on the upper flange 5 of the front plate 4 and four openings 21 are defined in the front plate 4. Two large openings 15, 16 are also defined in the front plate 4 for receiving and accommodating disk drives (not shown) or other devices. Ventilation holes 19 are defined in a lower portion of the front plate 4 for facilitating heat dissipation from the computer and air ventilation. Additional holes 17 are defined in the front plate 4 for receiving fasteners (not shown) to secure the front plate 4 to the bottom plate 36 and components of the computer.

Referring to FIGS. 2 and 2A, in the embodiment illustrated, the bezel 40 has six retaining members 42 extending toward the front plate 4 of the frame 2. Each retaining member 42 comprises a resilient arm 52 mounted to the bezel 40 with a barb 43 having an inclined face 51 formed on a free end thereof for engaging with the corresponding notch or opening 33, 21 of the front plate 4. Preferably, the retaining members 42 are integrally formed with the bezel 40. Two of the retaining members 42 are formed on a top edge 48 of the bezel 40 for engaging with the notches 33 of the front plate 4 and the remaining four retaining members 42 engage with the four openings 21 defined in the front plate 4.

Also referring to FIGS. 3 and 3A, each opening 21 is formed by stamping the front plate 4 whereby a perpendicular tab 23 is formed and extends inward from an edge thereof. The tab 23 has a dimension substantially corresponding to the length of the resilient arms 52 whereby the barbs 43 engage with free edges 24 of the tabs 23. An arcuate section 22 is formed between the tab 23 and the front plate 4 for sliding along the inclined face 51 of the barb 43 to guide the insertion of the barb 43 into the opening 21. The free edge 24 of the tab 23 that may be sharp due to the stamping operation is inwardly exposed thereby eliminating the potential risk of scraping and damaging the resilient arm 52 of the retaining member 42. The barb 43 engages with the free end 24 of the tab 23 while the resilient arm 52 contacts and is supported by the tab 23 thereby securing the bezel 4 in position without damaging to the resilient arm 52.

Figure 4A:
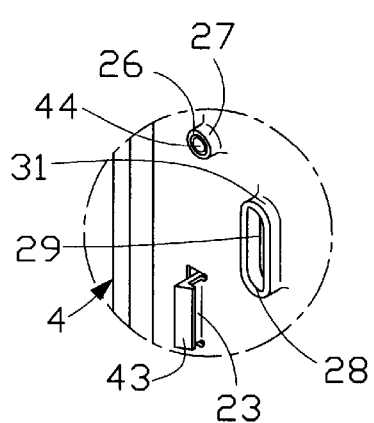
FIG. 4A is an enlarged view of encircled portion 4A of FIG. 4.
Figure 4:
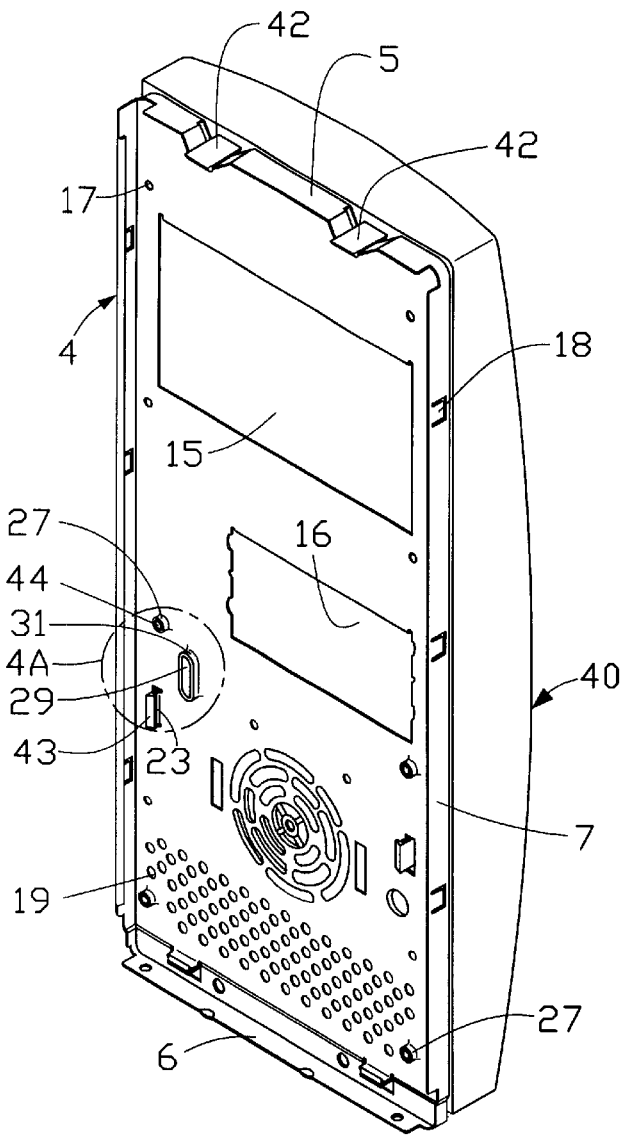
FIG. 4 is a perspective view of the bezel and the front plate assembled together.

Also referring to FIGS. 4 and 4A, bores 25 are defined in the front plate 4. Each bore 25 is further defined by a tubular projection 27 formed on and extending from the front plate 4 for snappingly receiving a corresponding positioning pin 44 formed on the bezel 40 for positioning purposes. Preferably, each tubular projection 27 has a length substantially corresponding to that of the positioning pin 44. Each positioning pin 44 contacts and is supported by an inside surface (not labeled) of the corresponding tubular projection 27 and a free edge 26 of the tubular projection 27 which may be sharp due to metal processing is inwardly exposed rather than facing the positioning pin 44 received in the bore 25 thereby preventing the positioning pin 44 from becoming scraped or damaged. Preferably, reinforcing ribs 41 are longitudinally formed on each positioning pin 44.

As shown in FIGS. 1 and 2, a power switch hole 45, a reset switch hole 46 and two indicator holes 47 are defined in the bezel 40 for respectively receiving a power switch, a reset switch and indicators (all not shown) therein. The power switch, the reset switch and indicators are powered by wires (not shown) connected to and extending from a main board (not shown) of the computer. The wires extend through an opening 29 (FIGS. 3, 3A, 4 and 4A) defined in the front plate 4. A circumferential wall 31 is formed on the front plate 4 and around a periphery of the opening 29 with a sharp free edge 28 thereof being inwardly exposed. The wires extending through the opening 29 contact and are supported by the circumferential wall 31 rather than engaging with the sharp edge 28 thereof whereby the wires are protected from being scraped and cut by the sharp edge 28.

The invention is to provide larger extended planar type engagement between the parts of the plastic bezel and the complementary parts of the metal frame, thus not only enhancing support therebetween, but also preventing improper cutting damage of the bezel due to sharp edges of the openings defined by the frame.

Although the present invention has been described with reference to the preferred embodiment, it is apparent to those skilled in the art that a variety of modifications and changes may be made without departing from the scope of the present invention which is intended to be defined by the appended claims.

What is claimed is:

1. A computer enclosure comprising:
   a frame having a front plate defining a plurality of openings, a guiding tab being formed along an edge of each opening and extending therefrom, the front plate defining a through opening with a circumferential wall projecting backwards for extension of at least one wire, a plurality of bores being defined on the front plate and each surrounded by a tubular projection, and
   a bezel comprising a plurality of retaining members received in corresponding openings and a plurality of positioning pins inserted into corresponding bores, each retaining member engaging with a free edge of the guiding tab for retaining the bezel on the front plate.

2. The computer enclosure as claimed in claim 1, wherein an arcuate section is formed between each guiding tab and the edge of the corresponding opening of the front plate for guiding the corresponding retaining member into the opening.

3. The computer enclosure as claimed in claim 1, wherein each retaining member has a length substantially corresponding to a dimension of the corresponding guiding tab for snappingly engaging with the free edge of the guiding tab.

4. The computer enclosure as claimed in claim 1, wherein each retaining member comprises a resilient arm extending from the bezel with a barb formed on a free end thereof.

5. The computer enclosure as claimed in claim 4, wherein an arcuate section is formed between each guiding tab and the edge of the corresponding opening of the front plate for guiding the barb of the corresponding retaining member into the opening.

6. The computer enclosure as claimed in claim 5, wherein the barb of each retaining member has an inclined face guided by and engaging with the arcuate section of the corresponding tab.

7. The computer enclosure as claimed in claim 4, wherein the resilient arm has a length substantially corresponding to a dimension of the corresponding guiding tab whereby the barb snappingly engages with the free edge of the guiding tab.

8. The computer enclosure as claimed in claim 7, wherein the resilient arm contacts and is supported by the corresponding guiding tab when the barb thereof engages with the free edge of the tab.

9. The computer enclosure as claimed in claim 1, wherein the positioning pins are snugly fit in the corresponding bores.

10. The computer enclosure as claimed in claim 1, wherein each tubular projection securely receives the positioning pin.

* * * * *